March 21, 1939.    P. F. SPERRY    2,151,536
FILM WINDING MEANS FOR CAMERAS AND THE LIKE
Filed Aug. 15, 1938
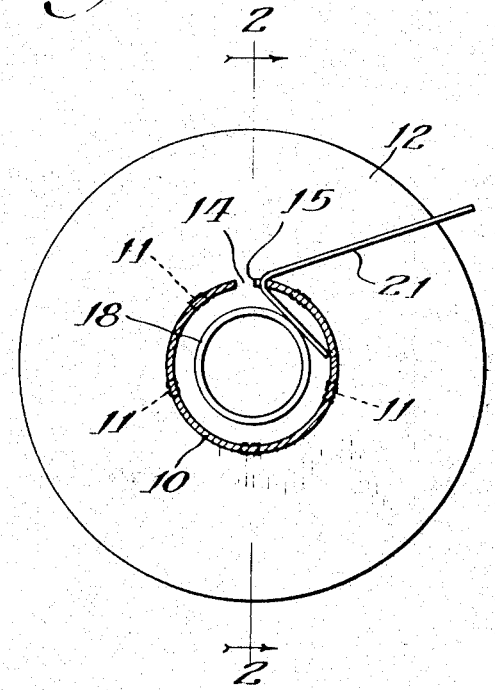
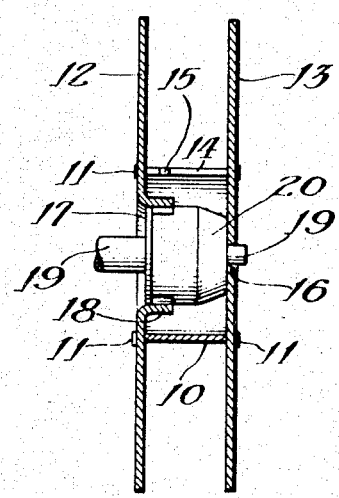
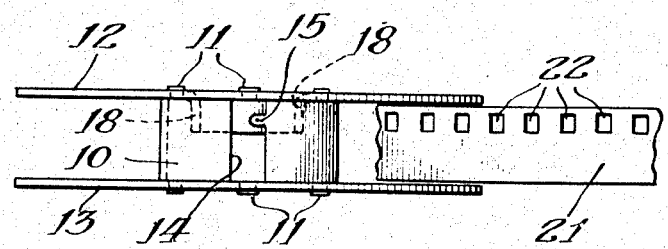
Inventor:
Philmore F. Sperry,
By: Zabel, Carlson, Fitzhugh & Wells
Attorneys Patented Mar. 21, 1939

2,151,536

UNITED STATES PATENT OFFICE

2,151,536

FILM WINDING MEANS FOR CAMERAS AND THE LIKE

Philmore F. Sperry, Chicago, Ill., assignor to Excel Auto Radiator Company, Chicago, Ill., a corporation of Delaware Application August 15, 1938, Serial No. 224,876

3 Claims. (Cl. 242—70)

My invention relates to film winding means in the form of a reel or spool and means for rotating the reel for winding a film thereon, and it has particularly to do with means provided for releasably attaching the film to the reel and for supporting and rotating the reel. Moving picture cameras using films of the 8 mm. size are in many instances operated by amateurs who have comparatively little knowledge of photography or cameras and comparatively little mechanical skill, for which reason it is highly important that such cameras be made as simple and as easy as possible for successful operation and that such operation should involve a minimum of likelihood that difficulties may arise. It is accordingly the object of my invention to provide an improved arrangement for attaching the film to the windup reel so as to make it possible for any average owner of such a camera to perform the operation of attaching the film and mounting the reel in position in the camera without undue difficulty.

In the use of some of the devices of the prior art, annoyance and delay have been brought about many times by reason of the film being inserted too far through the mounting slot in the drum portion of the winding reel so as to be in position to interfere with the engagement of the driving member of the camera with the reel when an attempt is made to insert the connected reel into the camera. It has been one of the objects of my invention to provide an improved arrangement of reel parts and driving and supporting means whereby any danger of trouble by reason of the displacement of the film from normal position shall be avoided.

It is another object of my invention to improve devices of this type in sundry details hereinafter pointed out. The preferred means by which I have accomplished my several objects are illustrated in the drawing and are hereinafter specifically described. That which I believe to be new and desire to cover by Letters Patent is set forth in the claims.

In the drawing—

Fig. 1 is a central vertical sectional view through my improved reel, with a short section of film secured thereon.

Fig. 2 is a vertical sectional view taken substantially on the line 2—2 of Fig. 1, with the reel in position on the driving and supporting spindle of the camera; and Fig. 3 is an edge view of my improved device as seen from above the device in Fig. 1, a short section of film being shown at the right ready for connection with the reel.

Referring now to the several figures of the drawing, in which corresponding parts are indicated by the same reference characters, 10 indicates a drum formed of sheet metal bent into cylindrical shape and connected by means of lugs 11 with end plates 12 and 13 which are positioned parallel to each other transversely of the drum. As is clearly shown in Figs. 1 and 3, the end portions of the sheet metal strip comprising the body of the drum stand in slightly spaced relations to each other at their meeting edges so as to provide a transversely extending slot 14, one of the edge portions adjacent to the slot being provided with a circumferentially extending pin or lug 15 which projects part way across the slot 14.

As is best shown in Fig. 2, the end plate 13 is provided with an opening 16 therethrough in concentric position with respect to the drum 10. The end plate 12 in turn is provided with a comparatively much larger opening 17 therethrough, with a sleeve 18 formed integrally with the end plate 12 about the edge of the opening 17, the opening 17 and the sleeve 18 being also in concentric position with respect to the drum 10.

In the arrangement shown, the means for mounting the drum in position and for rotating it comprises a spindle 19 provided with a head 20 thereon. The arrangement is such that the spindle 19 and head 20 are adapted to support the drum removably in position, the spindle extending through the opening 16 in the end plate 13 and the head having an effective frictional driving engagement with the inner face of the driving sleeve member 18 of the reel. The head 20 is to be of any suitable type by which a frictional driving relationship with the sleeve is effected.

For connection of a film 21 with the reel, the end of the film is inserted through the slot 14 with the openings 22 of the film opposite the pin or lug 15. The film is then doubled backwardly, toward the right in Fig. 1, so as to bring the pin 15 into engagement with any one of said openings 22, this result being easily attainable by a pull outwardly on the film. As will be readily understood, with the film engaged as shown in Fig. 1, upon rotation of the reel in counter-clockwise direction in said Fig. 1 the film will be wound evenly and smoothly about the drum 10 between the end plates 12 and 13.

As will also be readily understood, when the film 21 is inserted through the slot 14 in the drum the end of the film is deflected toward one side of the drum by reason of contact with the sleeve 18. If the film is inserted far enough through the slot, the end portion is caused to wind around the sleeve 18 inside of the drum 10 without any tendency for the film to move into position across the end of the sleeve 18. In other words, the sleeve 18 serves effectively for preventing the film from approaching closely the axis of the drum. As a result of this arrangement, the spindle 19 and the head 20 are always capable of being inserted readily into position without any interference from the film such as might prevent proper seating of the spindle and head in the openings 16 and 17.

While I prefer to employ the form of device as shown in my drawing and as above described, it is to be understood that my invention is not limited to the arrangement as shown except so far as the claims may be so limited, it being understood that changes might well be made in the form and arrangement of parts without departing from the spirit of my invention.

I claim:

1. In a device of the type described, the combination of a hollow drum having a slot through its wall at one side portion thereof, a mounting pin at said slot for engagement with an opening through a film for securing the film releasably to the drum for winding thereon, end plates connected with said drum in transverse position for causing the film to wind evenly thereon, one of said end plates having a small opening therethrough and the other having a comparatively much larger opening therethrough both in concentric position with respect to the drum, means for supporting and driving said drum, comprising a spindle engaging the smaller one of said openings, and a head carried by said spindle having an effective driving engagement with the larger one of said openings so as to rotate said drum by power from said spindle, and a sleeve extending about said spindle and head in spaced relation to the wall of the drum serving to hold the film out of the path of the spindle and head when the drum is being mounted in operative position thereon.

2. In a device of the type described, the combination of a hollow drum having a slot through its wall at one side portion thereof, a mounting pin at said slot for engagement with an opening through a film for securing the film releasably to the drum for winding thereon, end plates connected with said drum in transverse position for causing the film to wind evenly thereon, one of said end plates having a small opening therethrough and the other having a comparatively much larger opening therethrough both in concentric position with respect to the drum, a sleeve formed integrally with said end plate about said larger opening concentrically of the drum, and means for supporting driving said drum, comprising a spindle engaging the smaller one of said openings, and a head carried by said spindle having a frictional engagement with the inner face of said sleeve so as to drive said drum by power from said spindle, said sleeve serving to deflect the end of the film away from the axis of the drum when the film is inserted through said slot for connection with the drum, and serving to hold the film out of engagement with said spindle so as to prevent the film from interfering with the mounting of the drum into position.

3. In a device of the type described, the combination of a hollow drum having a slot through its wall for reception of the end of a film; means to releasably engage the end of a film projecting into said slot; end plates secured upon said drum; one of said plates having a central opening to receive the end of a driving spindle; the remaining end plate having a relatively larger opening to receive a drive head carried by the spindle; the last named plate being provided about its opening with a cylindrical flange extending within said drum toward said first named plate for frictional driving engagement with the drive head of the spindle.

PHILMORE F. SPERRY.